310-13 SR

FIP8502 OR 4,220,878

United States Patent [19]

Asano et al.

[11] 4,220,878

[45] Sep. 2, 1980

[54] DRIVE-FRAME SUPPORT MECHANISM FOR FORCE MOTOR

[75] Inventors: Masuyuki Asano, Nishikasugai; Shojiro Omuro, Nagoya, both of Japan

[73] Assignee: Mitsubishi Jukogyo Kabushiki Kaisha, Japan

[21] Appl. No.: 971,258

[22] Filed: Dec. 20, 1978

Related U.S. Application Data

[63] Continuation of Ser. No. 737,339, Nov. 1, 1976, abandoned.

[30] Foreign Application Priority Data

Oct. 31, 1975 [JP] Japan ............................ 50-148710

[51] Int. Cl.$^{2}$ ........................................ H02K 41/02

[52] U.S. Cl. ..................................... 310/13; 310/27

[58] Field of Search .............................. 310/12-14, 310/27, 272, 222; 375/229, 230

[56] References Cited

U.S. PATENT DOCUMENTS

| | | | |
|---|---|---|---|
| 2,556,816 | 6/1951 | Lukacs | 335/222 |
| 2,657,374 | 10/1953 | Bardeen | 310/27 X |
| 2,754,435 | 7/1956 | Ongaro | 310/27 |
| 3,624,896 | 12/1971 | Daubeney et al. | 310/27 X |

*Primary Examiner*—Donovan F. Duggan

*Attorney, Agent, or Firm*—McGlew and Tuttle

[57] ABSTRACT

A drive-frame support mechanism for a force motor includes a pair of coil springs arranged upon and under the drive frame of the motor to hold the frame in between, and a spring of a smaller spring constant disposed between the support stem of the drive frame and the body of the motor.

3 Claims, 4 Drawing Figures

DRIVE-FRAME SUPPORT MECHANISM FOR FORCE MOTOR

This is a continuation of application Ser. No. 737,339 filed Nov. 1, 1976, now abandoned.

This invention relates to improvements in the drive-frame support for the force motor usually used with a servo valve.

As is well-known, the force motor comprises a mechanism for converting an electric signal into mechanical displacement and is usually built in a servo valve.

The force motor is characterized in that large hydraulic power output from the servo valve can be controlled by a low-energy signal.

Conventionally, drive frames of the force motors for servo valves have been supported in two different ways as typically represented in FIGS. 1 and 2.

The supporting method illustrated in FIG. 1 consists of arranging coil springs 1 of high spring constant accuracy upon and under the drive frame 2 and having a support stem 10 of the drive frame supported vertically movably by a linear-motion bearing 7. In the same figure, 3 is a drive coil, 4 is a magnetic pole member, 5 is an excitation coil or permanent magnet, 6 is a zero-adjusting rod, and 8 is a pole piece.

An advantage gained from this first support arrangement is that the use of coil springs 1 having good spring constant accuracy improves the linearity of the electromagnetic force-displacement characteristic of the force motor. On the other hand, the drive frame 2 with the support stem 10 supported by the linear-motion bearing 7 involves friction as it moves upward and downward, posing a problem of short apparatus life.

The other supporting method illustrated in FIG. 2 uses a flat spring 9 in place of the above-mentioned coil springs 1 and bearing 7. The rest of parts indicated by like numerals are like the counterparts in FIG. 1. This second method has problems of nonlinearity, temperature drift, and other instable factors in addition to dispersion of product quality because the spring constant of the flat spring 9 can hardly be held to precise tolerances.

It is an object of the present invention to provide a drive-frame support mechanism for a force motor which solves the foregoing problems by supporting the drive frame by means of coil springs with a good spring constant accuracy and a spring, e.g., an S-shaped spring, of a smaller spring constant than the coil springs.

According to the present invention, the drive-frame support mechanism includes a pair of coil springs arranged upon and under the drive frame to hold the frame in between, and a spring of a smaller spring constant disposed between the support stem of the drive frame and the body of the motor. This construction permits the drive frame to move without friction but with good linearity characteristic. Furthermore, the problems of temperature drift and irregularity of product quality are settled and extended apparatus life is ensured.

The above and other objects and advantages of the invention will become more apparent from the following description taken in conjunction with the accompanying drawings, in which:

FIGS. 4(I) and 4(II) are plan views of two different S-shaped springs for use in the support mechanism according to the invention.

Figure 1:
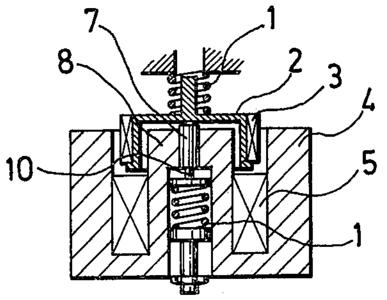
FIG. 1 PRIOR ART
FIGS. 1 and 2 are schematic sectional views of two different drive-frame support mechanisms of conventional designs for force motors of servo valves.
Figure 2:
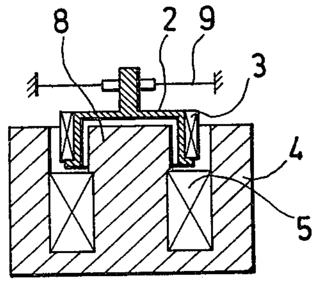
FIG. 2 PRIOR ART
Figure 3:
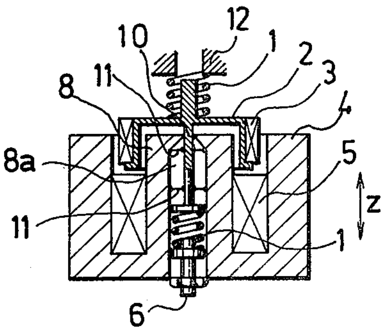
FIG. 3 is a schematic sectional view of a drive-frame support mechanism embodying the present invention.

Referring to FIG. 3, in which parts like or corresponding to those in FIGS. 1 and 2 are indicated by like numerals, there is schematically shown the construction of a force motor for a servo valve, with a drive-frame support mechanism embodying the invention.

As shown, a drive frame 2 has a support stem 10 extending downward and carries a drive coil 3 wound on its periphery. As in existing force motors of this type, a magnetic pole member 4 and a pole piece 8 are located outside and inside, respectively, of the drive coil 3. In the lower part of the space between the pole piece 8 and the pole member 4 is fixed a permanent magnet or excitation coil 5 to provide a radial magnetic flux density in that space.

The support mechanism for the drive frame 2 will now be described. The drive frame 2 is held in place by a pair of coil springs 1 with a high spring constant accuracy and also by two S-shaped springs 11 to be described later. The coil springs 1 are located in suitably compressed state upon and under the drive frame 2 to hold the frame in between, in the same manner as shown in FIG. 1. The coil spring 1 on the drive frame is disposed between the upper surface of the drive frame and a spring seat 12. The other coil spring under the frame is inserted between the flanged lower end of the support stem 10 and a zero-adjusting rod 6 for adjusting the initial position for motion of the drive frame.

The coil springs 1 are required to be of a higher spring constant than the S-springs 11. Desirably they are set to a spring constant such that their coefficient of elasticity, for example, in the direction z shown perpendicular to the plane xy, is greater than that of the S-shaped spring 11 by approximately 2.

Figure 4:
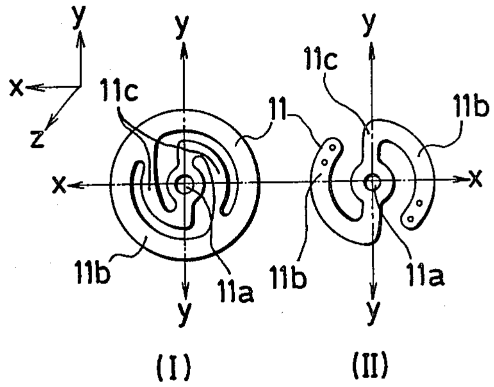

The S-shaped springs 11 are fitted in a space **8*a* formed in the pole piece 8. As shown better in FIGS. 4(I) and 4(II), it includes an S-shaped elastic piece 11*c*. The spring 11 in FIG. 4(I) is fabricated by punching a work in the form of a circular sheet so as to leave a substantially S-shaped elastic piece 11*c*** behind.

When fitting the spring 11 into the space **8*a*, it is introduced as the center hole 11*a* receives the support stem 10 of the drive frame 2 and is secured to an appropriate part of the stem. The outer periphery of the spring is fixed by suitable means to the surrounding wall of the space in the pole piece 8. In the case of the spring 11 shown in FIG. 4(II), the edges of the outer peripheral portions 11*b* are fixed to the surrounding wall. In this way the support stem 10 of the drive frame 2 is held upright and vertically movably in the center of the space 8*a***.

With the drive-frame support mechanism of the construction above described, the force motor operates as follows. As a current flow through the drive coil 3, the radial magnetic field excited by the excitation coil or permanent magnet 5 generates a sufficient electromagnetic force to move the drive frame 2 in the direction z shown. At this time, the characteristic of the drive frame 2 in its motion in the direction z exhibits good linearity by virtue of the coil springs 1.

Supported by the S-shaped spring 11, the support stem 10 is free to move without subjection to any friction, thus making it extremely easy for the drive frame 2 to move in the direction z. The S-spring displays very high rigidity with respect to the forces that act in the directions x and y perpendicular to the direction z in FIG. 3, and provides a secure support as a frictionless guide for the support stem 10. Until the flat spring 9 in FIG. 2, the S-shaped spring 11 does not act directly on the motion of the drive frame 2 (the action upon the frame motion being mostly by the coil springs 1) and, as a consequence, there is no possibility of any change in temperature around the spring 11 influencing the output of the force motor.

As stated above, the support mechanism according to this invention includes a pair of coil springs arranged to hold the drive frame of the force motor in between, and a spring of a smaller spring constant than the coil springs, disposed between the support stem of the drive frame and the force motor body. This construction brings a number of advantages. It enables the drive frame to move without friction, attaining enhanced linearity of the motion relative to changes in the magnetic flux. Moreover, the problems of temperature drift and dispersion of product quality are solved and the life of the apparatus is prolonged.

What is claimed is:

1. A force motor construction, comprising, a magnetic pole piece having a central portion with an opening therethrough defining a drive frame support journal and a spring cavity defined below the opening and having an angular coil cavity surrounding said central portion, an excitation coil in said coil cavity, a drive frame having a central pin part with a lower pin portion extending through the opening and an upper pin portion opposite to the lower pin portion, a first coil spring engaged on said upper pin portion, a second coil spring engaged on said lower pin portion, a first support holding said first coil spring downwardly against said drive frame, the second support holding said second coil spring upwardly against said frame and a pair of small spring constant springs in the cavity between said first and second support springs and having first and second opposite curved portions and an oblique central portion interconnecting said curved portions, each of said small spring constant springs being connected by their periphery to said pole piece central portion and by its center to said central pin part and supporting said drive frame against circumferential and radial movement.

2. A force motor construction, as claimed in claim 1, wherein said small spring constant springs comprise S-shaped springs.

3. A force motor construction, as claimed in claim 2, wherein each of said S-shaped springs includes an annular portion interconnecting respective outer ends of the respective curved portion.

* * * * *